United States Patent
Murphy (10) Patent No.: US 8,983,865 B1
(45) Date of Patent: Mar. 17, 2015

(54) SYSTEM AND METHOD FOR CALCULATING STORE DISPLAY LAYOUTS

(71) Applicant: Google Inc., Mountain View, CA (US)

(72) Inventor: Bruce W. Murphy, Pyrmont (AU)

(73) Assignee: Google Inc., Mountain View, CA (US)

( * ) Notice: Subject to any disclaimer, the term of this patent is extended or adjusted under 35 U.S.C. 154(b) by 195 days.

(21) Appl. No.: 13/624,796

(22) Filed: Sep. 21, 2012

(51) Int. Cl.
*G06Q 10/00* (2012.01)

(52) U.S. Cl.
USPC .......................................................... 705/28

(58) Field of Classification Search
None
See application file for complete search history.

(56) References Cited

U.S. PATENT DOCUMENTS

2011/0261049 A1* 10/2011 Cardno et al. ................ 345/419
2012/0233003 A1* 9/2012 Calman et al. .................. 705/16

* cited by examiner

*Primary Examiner* — Paul Danneman
(74) *Attorney, Agent, or Firm* — Dority & Manning, P.A.

(57) ABSTRACT

A system and machine-implemented method for associating a product category of consumer products with a location is provided. Data corresponding to consumer products is received, using one or more computing devices. Data for each of the consumer products includes corresponding location information. Each of the consumer products is identified based on the received data, using the one or more computing devices. A product category for each of the identified consumer products is determined, using the one or more computing devices. The consumer products are grouped based on the determined product categories and the corresponding location information, using the one or more computing devices. At least one determined product category is associated and stored with at least one location based on a density of the grouped consumer products and the corresponding location information, using the one or more computing devices.

17 Claims, 5 Drawing Sheets

SYSTEM AND METHOD FOR CALCULATING STORE DISPLAY LAYOUTS

BACKGROUND

The present disclosure generally relates to calculating a display layout, and, in particular, to calculating a display layout by associating a product category with a geographic location based on signals received from user devices.

Web-based applications are often used to provide geographic location information of physical objects on a graphical layout. For example, a mapping application may provide information such as a geographic location of a business associated with a particular address on a map. This type of location information, however, provides accurate information for static physical objects (e.g., business, addresses, landmarks) that require infrequent updates.

SUMMARY

The disclosed subject matter relates to a machine-implemented method for associating a product category of consumer products with a location. Data corresponding to consumer products is received, using one or more computing devices. Data for each of the consumer products includes corresponding location information. Each of the consumer products is identified based on the received data, using the one or more computing devices. A product category for each of the identified consumer products is determined, using the one or more computing devices. The consumer products are grouped based on the determined product categories and the corresponding location information, using the one or more computing devices. At least one determined product category is associated and stored with at least one location based on a density of the grouped consumer products and the corresponding location information, using the one or more computing devices.

The disclosed subject matter also relates to a machine-readable medium including instructions stored therein, which when executed by a system, cause the system to perform operations including receiving images containing consumer products, each of the images having corresponding location information. The consumer products in the images are identified and a product category for each of the identified consumer products is further identified. The images are grouped based on the determined product categories and the corresponding location information. At least one determined product category is associated and stored with at least one location based on a density of the grouped images and the corresponding location information.

According to various aspects of the subject technology, a system including one or more processors and a machine-readable medium including instructions stored therein, which when executed by the processors, cause the processors to associate a product category of consumer products with a location, is provided. Data corresponding to consumer products is received. Data for each of the consumer products includes corresponding location information. Each of the consumer products is identified based on the received data, and a product category for each of the identified consumer products is determined. The consumer products are grouped into clusters based on the determined product categories and the corresponding location information. Each cluster includes a product category and a given location. A map layout corresponding to a physical layout of an area of interest is created based on the clusters. The layout provides a representation of product categories at different locations of the layout.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to a machine-implemented method for associating a product category of consumer products with a location, using one or more computing devices. Data corresponding to consumer products is received. Data for each of the consumer products includes corresponding location information. Each of the consumer products is identified based on the received data. A product category for each of the identified consumer products is determined. The consumer products are grouped based on the determined product categories and the corresponding location information. At least one determined product category is associated and stored with at least one location based on a density of the grouped consumer products and the corresponding location information.

Figure 1:
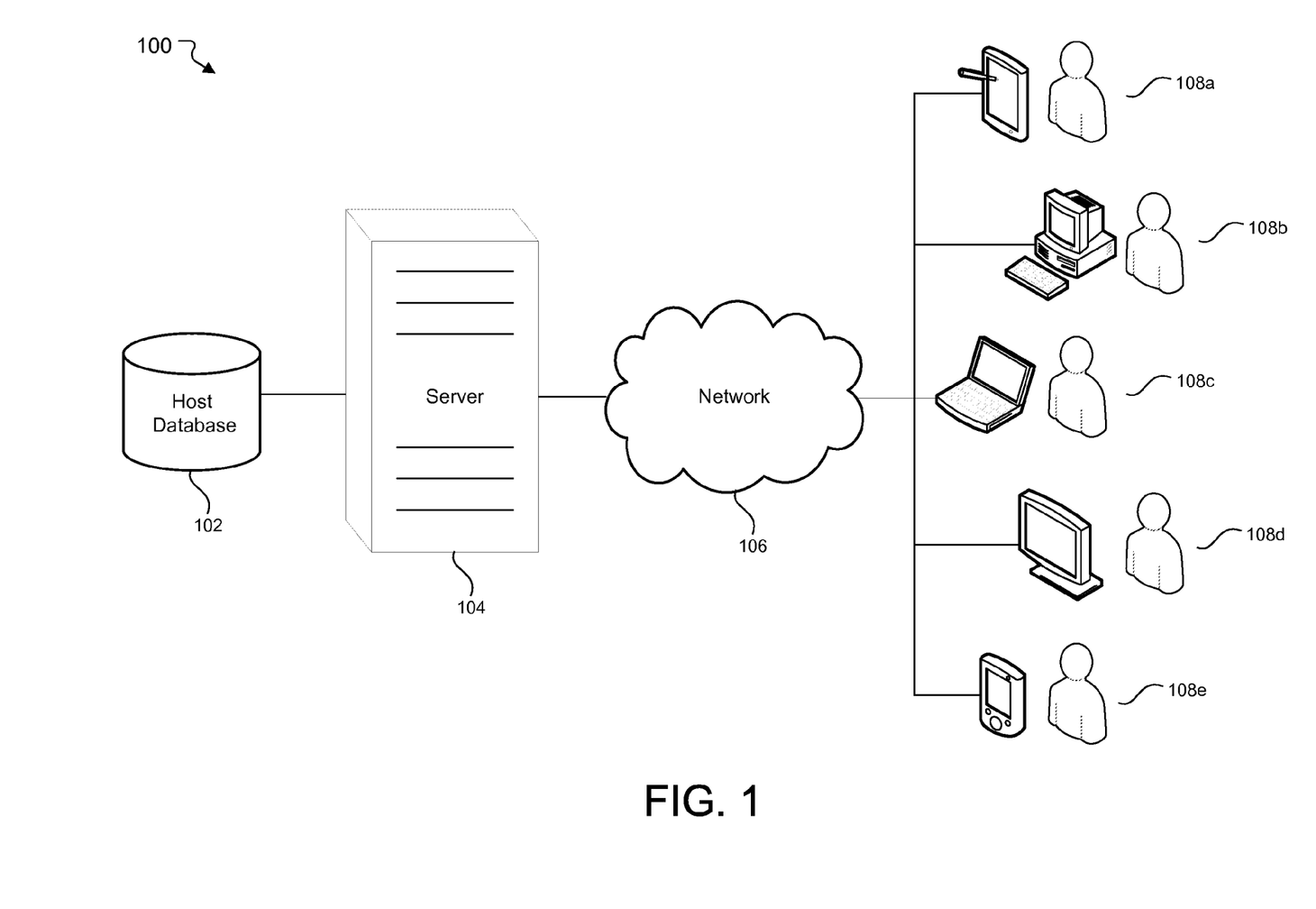
FIG. 1 illustrates an example network environment which provides for associating a product category of consumer products with a geographic location.

FIG. 1 illustrates an example network environment which provides for associating a product category of consumer products with a geographic location. Network environment 100 includes a data repository 102 (e.g., computer-readable storage media) for storing a variety of data accessed by web-based applications. While the network environment 100 includes a single data repository 102 in FIG. 1, the network environment may include additional data repository in some implementations. Data repository 102 may store description data and location data of consumer products.

The network environment 100 further includes server 104. While the network environment 100 includes a single server in FIG. 1, the network environment may include several interconnected servers in some implementations. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from data repository 102 and serve the set of information to client devices 108a-108e.

Each of client devices 108a-108e can represent various forms of processing devices. Example processing devices can include a desktop computer, a laptop computer, a handheld computer, a television with one or more processors embedded or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

Each of client devices 108a-108e may be any machine configured to generate and transmit a signal that includes location information determined via a cellular, a wi-fi, and/or a GPS network to server 104. In some aspects, client devices 108a-108e may include one or more client applications (e.g., mapping applications, GPS applications, location service applications, or other processes) configured to generate and transmit location information signals to a server. The location information signals may include coordinates (e.g., longitude and latitude coordinates) based on a GPS network and/or other location information provided by a cellular or wi-fi network. Additionally, a time stamp indicating when the location information was generated may also be included.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
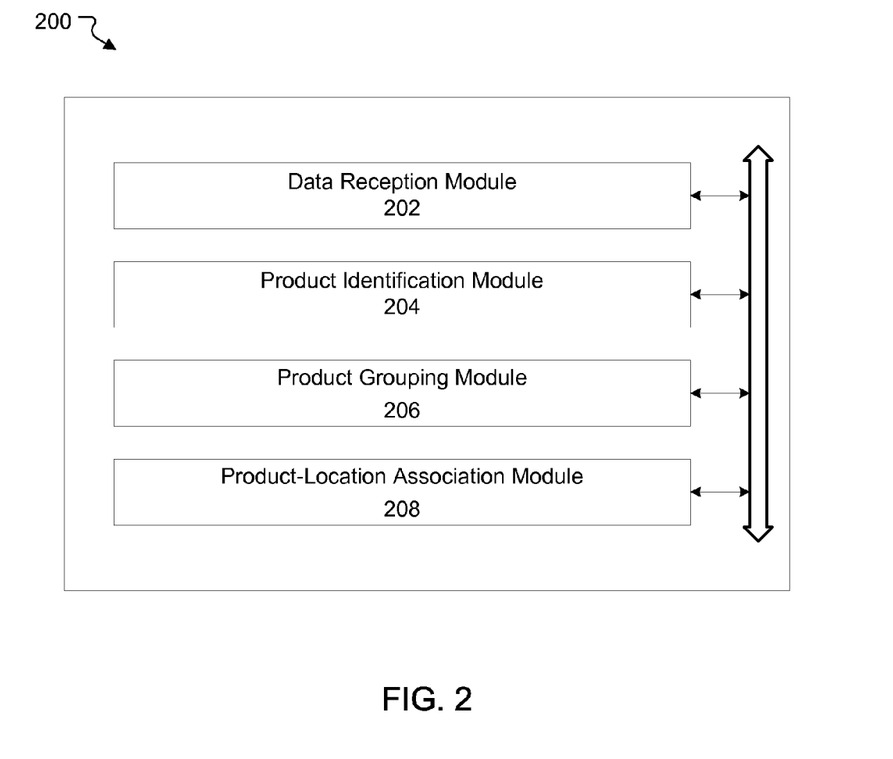
FIG. 2 illustrates an example of a server system for associating a product category of consumer products with a geographic location.

FIG. 2 illustrates an example of a system. System 200 includes data reception module 202, product identification module 204, product grouping module 206 and product-location association module. These modules, which are in communication with one another, process data received from client devices 108a-108e in order to associate a product category of consumer products with a geographic location. Data corresponding to consumer products submitted by users via client devices 108a-108e may be received by data reception module 202. For example, a user browsing consumer products at a retail store may capture an image of a consumer product of interest and upload the image to a server.

Product identification module 204 then identifies the consumer products based on the received data (e.g., the captured image) and determines product categories for each of the identified consumer products. For example, if the consumer product in the captured image is identified as a baseball bat, the corresponding product category may be determined to be "sporting goods." The consumer products may then be grouped based on the determined product categories and corresponding location information by product grouping module 206. Once the consumer products are grouped, product categories are associated with different geographic locations based on a density of the grouped consumer products and the corresponding location information by product-location associate module 208. Thus, if a high density of consumer products categorized as "sporting goods" corresponds to a specific geographic location, then the "sporting goods" category is associated with the specific geographic location. In some implementations, a brand and/or a product name of the consumer product may be identified from the captured image (e.g., brand ABC and model XYZ bat). Thus, consumer products may also be grouped based on the identified brand and model, and corresponding location information.

By grouping the products (by product categories and/or brand and product name), a geographic map of the distribution of consumer products may be created for an area of interest. In some instances, a geographic location of a specific brand or item is provided on a map. In other instances, simply a geographic location of a general product category such as "sporting goods" is provided. The geographic map may be used to provide certain information corresponding to product category groups when a client device is identified as being within close proximity to a particular consumer product. For example, a price special for a consumer product may be sent to the client device when the client device is determined to be close to the geographic location of the consumer product on the geographic map. Alternatively, when a user enters a search for a consumer product in a search engine on the client device, a geographic location of the searched consumer product determined from the geographic map may be sent to the user operated client device.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
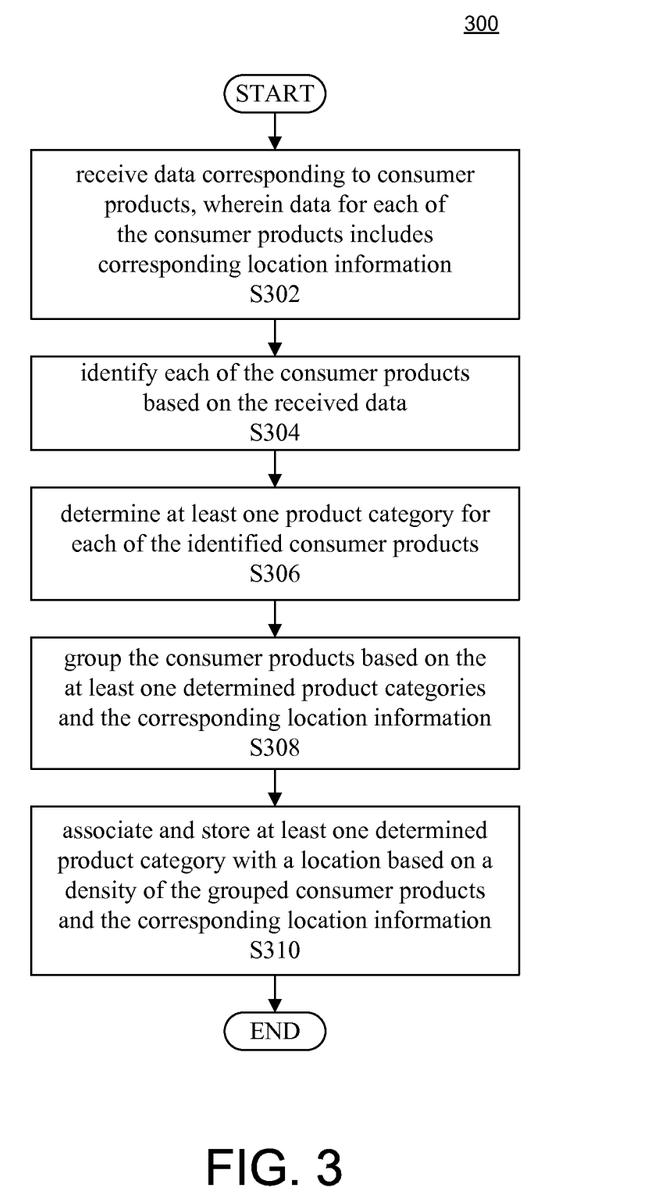
FIG. 3 illustrates an example method for associating a product category of consumer products with a geographic location.

FIG. 3 illustrates example method 300 for associating a product category of consumer products with a geographic location. Data (e.g., image data, location information, time stamp, etc.) corresponding to consumer products is received in S302. For example, a user browsing consumer products at a retail store may capture an image of a consumer product, and the image, along with additional data such as location information and a time/date stamp, may be uploaded to a server. The consumer products are identified based on the received data in S304. When the received data corresponding to consumer products includes graphical representations of the consumer products, the consumer products may be identified by comparing characteristics of the graphical representation (e.g., text, shapes, colors, patterns, etc.) with known characteristics of a consumer product stored in data repository 102. For instance, if a picture of a box of cereal is received, the box of cereal may be identified by comparing some combination of the text printed on the box, the color of the box, and the shape of the box with known characteristics of consumer products stored in data repository 102. In some aspects, a graphical representation of a consumer product received from a client device may further include a bar code or a quick response (QR) code attached to the consumer product. Thus, the consumer product may be identified by processing the graphical representation of a bar code or QR code to determine a corresponding serial number (e.g., a Universal Product Code number), and then identifying the consumer product based on the determined serial number.

In some implementations, the data corresponding to consumer products that is received in S302 may be associated with a query provided by the user. For example, a user browsing a consumer product may enter a description of the specific product (e.g., product name, a bar code number, a stock keeping unit number, etc.) as a search query in order to price comparison shop. The description of the product may be provided by speaking words into a microphone or as text input via a keypad or keyboard on a client device. Once entered as a query, the description may be used to identify the consumer product in S304. Since the user is likely to enter a description of a product that the user is currently browsing in order to comparison shop, location information and a time/date stamp may be further extracted from the entered query in order to provide the necessary information to associate product categories of consumer products with a geographic location, as described in further details below.

At least one product category for each of the identified consumer products is determined in S306. For example, a baseball bat may be associated with the general category of "sporting goods", or with the more specific category of "baseball equipment". Once the product category is determined, the consumer products are grouped based on the determined product categories and the corresponding location information in S308. The determined product category is associated with a geographic location based on a density of the grouped consumer products and the corresponding location information, and the association is stored in memory.

The association of the identified consumer product to at least one product category may also be made based on known characteristics of the consumer product store in data repository 102. As described above, a baseball bat may be associated with the general category of "sporting goods". The baseball bat may also be associated with more specific sub-categories of "team sports" and "baseball". In some aspects, a product category may include a brand of the consumer product. Thus, the baseball bat may be categorized by brand and in some instances, the particular model of the bat. Different granularities of categories are provided in order to provide an appropriate level of specificity when building a geographic map of consumer products of an area of interest, as described in further details below. In some instances, it may be important to know what specific brand or item is available at a particular geographic location of the map. In other instances, simply knowing that a user in a geographic location of a general category such as "sporting goods" is satisfactory.

In some implementations, the geographic location of the client device is known at the time the graphical representation of a consumer product is captured (whether the graphical representation is received simultaneous to the capture or at a time later than the capture). The geographic location of the client device may be determined via one or more client applications, such as a mapping application, GPS application, or other process, configured to generate and transmit GPS signals to server 104. The GPS signals may include GPS coordinates and, in some cases, a time stamp indicating when the GPS signal was generated. In some aspects, the geographic location of the client device may be determined via cellular triangulation, or based on a wi-fi network to which the client device is connected. An approximation may be made as to where an identified consumer product is located based on the determined geographic location.

Figure 4:
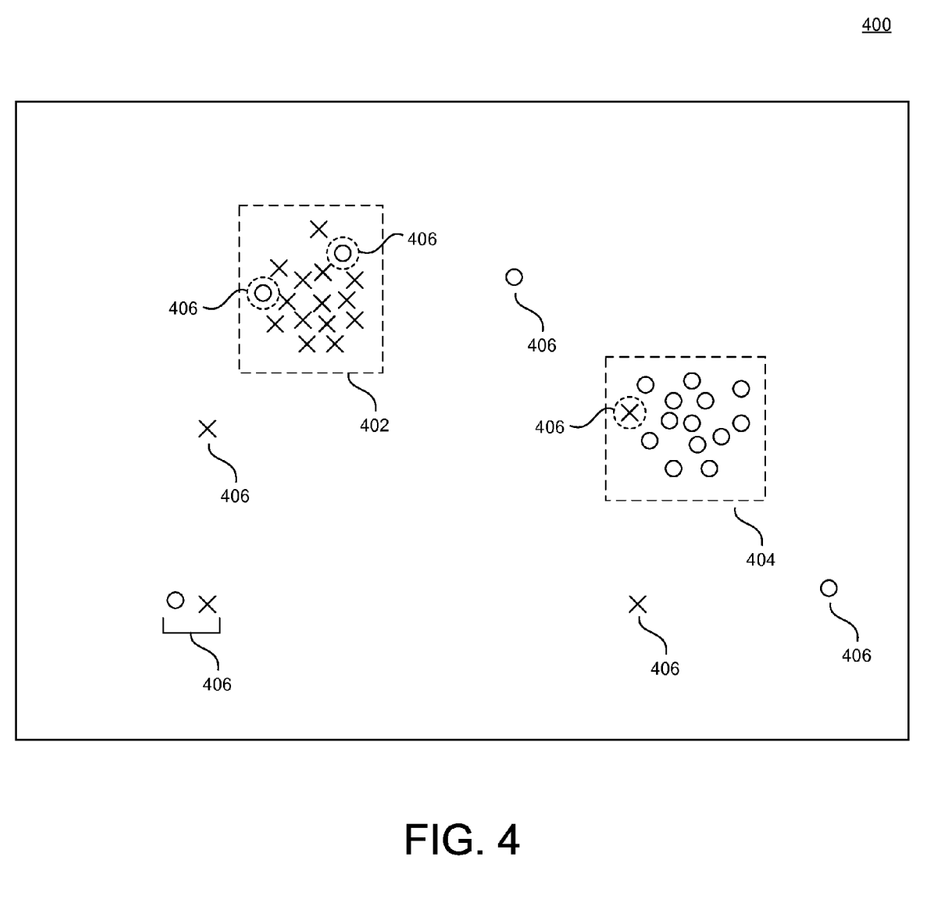
FIG. 4 provides a graphical representation of an example layout of clusters of consumer products.

Once the geographic locations of the consumer products and the associations of the consumer products to product categories are determined, a distribution of a particular product category in an area of interest may be determined based on clusters of consumer products of the same product categories in the area of interest. FIG. 4 provides a graphical representation of an example layout 400 of clusters of consumer products in an area of interest. Each X and each O in layout 400 represents data received that corresponds to a particular consumer product. As discussed above by reference to FIG. 3, each consumer product is identified and categorized based on the received data. In this example, the data received have been categorized into two consumer product categories—products of a first consumer product category is represented by Xs and products of a second consumer product category is represented by Os.

While this example provides clustering information on only two consumer product categories, clustering information for multiple additional consumer products may be provided in other aspects. Based on the distribution of the Xs and Os in layout 400, cluster 402 and cluster 404 may be identified. In some aspects, a cluster may be identified based on a density of the grouped consumer products and the corresponding location information. For example, a cluster may be identified when a density of a consumer product exceeds a threshold value for a particular geographic location or area. Cluster 402 includes 14 instances of a consumer product of a first category within close proximity to one another. Similarly, cluster 404 includes 13 consumer products of a first category within close proximity to one another. In this example, both cluster 402 and cluster 404 have been identified as having densities of consumer products X and O, respectively, that exceed the threshold value for a particular.

The density of consumer products may also me used to calculate a confidence level that a particular product category is associated with a particular geographic location. For example, individual instances data corresponding to consumer products that are not associated with a cluster of other similar consumer products may be determined to be outliers of the set of data. Outlying data corresponding to consumer products 406 are examples of such instances of data. Certain instances of data may be associated with a cluster, but may not be consistent to the consumer product category of the cluster. Other instances of data may be associated with an area for which no other data is received. Thus, outlying data corresponding to consumer products 406 may be disregarded as an error or simply noise of the received set of data.

In some aspects, a map of the area of interest may be generated. The map may include labels that correspond to identified clusters of categories of consumer products. As described above, the granularity of the map with regards to the categories of consumer product may be adjusted according to the number of categories of consumer products provided. For example, a category of sporting goods may not provide any useful information when the area of interest corresponds to a sporting goods store. Thus, higher resolution categories may be used (e.g., team sports, baseball, baseball bats, particular brand of baseball bats, etc.). Conversely, for an area of interest that provides a wide array of consumer product offerings, such as a supermarket, a lower resolution of categories may be used. For example, categories such as dairy, cereal, fruits/vegetables, canned foods, etc., may be used to effectively lay out the organization of a store without going into specific types or brands of each category. A brand and/or a product name of the consumer product may also be identified from the captured image (e.g., brand ABC and model XYZ bat), such that consumer products may be grouped based on the identified brand and model. In some aspects, a layout map of the area of interest is provided, and the product categories and their corresponding geographic locations are utilized to populate different locations of the layout map.

The resolution of categories may be an automatically adjusted such that the number of distinct categories that exists for an area of interest exceeds a predetermined threshold value. For example, if a lower resolution of categories is used (e.g., sporting goods), and only five categories are provided for the area of interest, an adjustment may be made to increase the resolution of the categories (e.g., specific sports or specific products for each sport). By increasing the resolution, additional categories may be provided and thus a more useful map may be generated based on the received data corresponding to consumer products. In some aspects, a user adjustment to the resolution of categories may be received so that a map with a user desired resolution may be generated.

The determined product categories associated with different geographic locations may be stored in a data repository for retrieval for use with a variety of applications. The stored information may correspond to a map generated based on the product categories associated with different geographic locations. The map may be used to identify product categories that are within close proximity to a mobile device operated by a user and for which geographic location may be determined through a variety of location services. By identifying the product categories within close proximity to a user operated mobile device, different signals corresponding to the product categories may be sent to the mobile device to provide information that may be useful to the user of the mobile device. For example, a coupon or information about special sales corresponding to a consumer product of a product category within close proximity to a user operated mobile device may be sent to the mobile device.

Additionally, the product categories associated with different geographic locations stored in the data repository may be further modified by any additional data received that correspond to consumer products. For example, if the map layout of an area of interest has been modified, the additional data received may produce clusters that are inconsistent with the existing stored layout. When the receipt of inconsistent data causes the confidence level of a cluster to fall below a threshold, then certain areas of the map may be re-categorized according to the received additional data. In some aspects, the time stamp for the received data may be considered when identifying a cluster. For example, newer data (e.g., data with more recent time stamps) may be given more weight in the identification of a cluster than older data (e.g., data with less recent time stamps). In some aspects, the received data may be assigned predetermined lifespans, where the data is removed from consideration once the lifespan of the data has elapsed. In doing so, updated associations of product categories with different geographic locations may be maintained.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
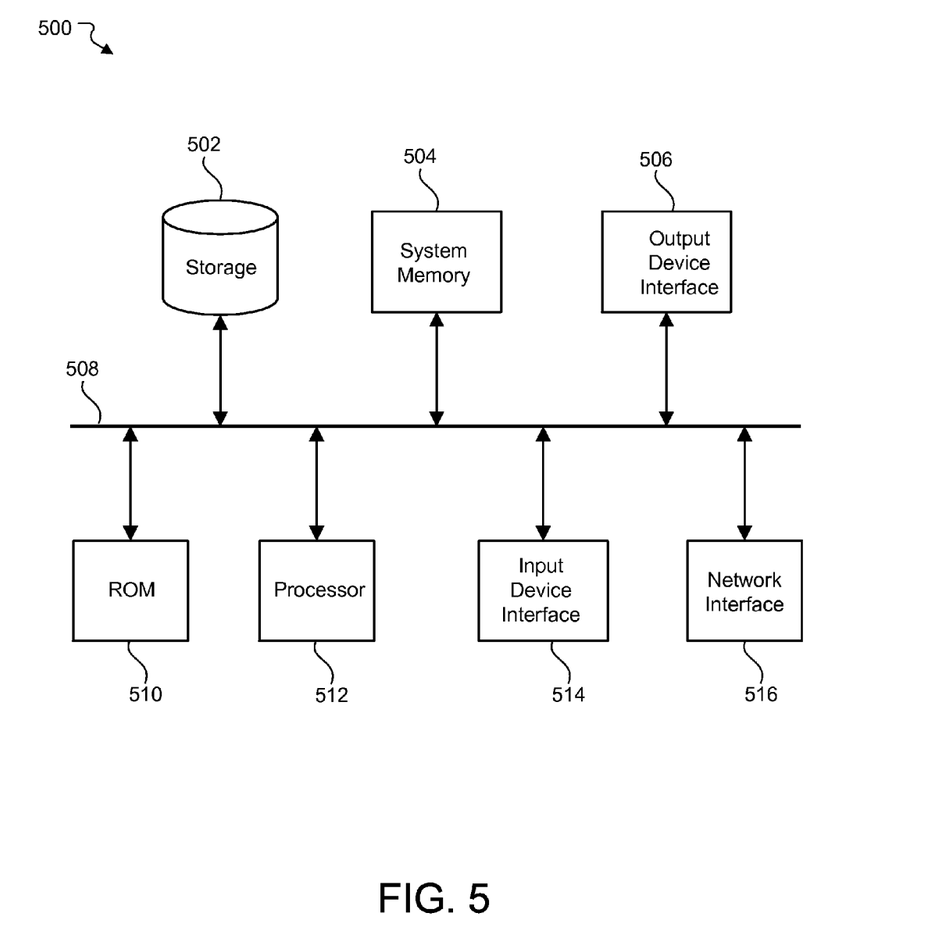
FIG. 5 conceptually illustrates an example electronic system with which some implementations of the subject technology are implemented.

FIG. 5 conceptually illustrates an example electronic system 500 with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for associating a product category of consumer products with a geographic location in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers, such as a local area network, a wide area network, or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method of associating a product category of consumer products with a location, the method comprising:
   receiving, using one or more computing devices, data corresponding to consumer products, wherein the data is received from one or more mobile devices and the data for each of the consumer products includes location data of a mobile device from the one or more mobile devices at a time the mobile device captured the data corresponding to the consumer product;
   identifying, using the one or more computing devices, each of the consumer products based on the received data;
   determining, using the one or more computing devices, a product category for each of the identified consumer products;
   grouping, using the one or more computing devices, the consumer products based on the product categories determined for the consumer products and the corresponding location data for the consumer products;
   associating and storing, using the one or more computing devices, at least one determined product category with at least one location based on a density of the grouped consumer products and the corresponding location data; and
   creating, using the one or more computing devices, a layout corresponding to a physical layout of an area of interest based on the association of the at least one determined product category with the at least one location, the layout providing a representation of the at least one product category at the at least one location.

2. The computer-implemented method of claim 1, wherein the received data corresponding to consumer products are images of the consumer products.

3. The computer-implemented method of claim 2, wherein identifying each of the consumer products based on the received data comprises comparing characteristics of the images of the consumer products with known characteristics of consumer products stored in the data repository.

4. The computer-implemented method of claim 3, wherein the characteristics of the images of the consumer products include at least one of text, a shape, a color, or a pattern.

5. The computer-implemented method of claim 2, wherein the images of the consumer products contain at least one of bar codes or quick response (QR) codes attached to the consumer products.

6. The computer-implemented method of claim 5, wherein the at least one of bar codes or QR codes attached to the consumer products are identified based on the graphical patterns of the bar codes or QR codes.

7. The computer-implemented method of claim 1, wherein the received data corresponding to consumer products are descriptions of the consumer products entered as spoken natural language or text inputs.

8. The computer-implemented method of claim 1, further comprising receiving, using the one or more computing devices, additional data corresponding to additional consumer products, wherein the layout corresponding to the physical layout of the area of interest is updated based on the received additional data.

9. A machine-readable medium comprising instructions stored therein, which when executed by a processor, cause the processor to perform operations comprising:
   receiving one or more images containing consumer products, each of the one or more images including corresponding location data, wherein the one or more images are received from one or more mobile devices, and wherein the location corresponding to each of the one or more images is location of a mobile device from the one or more mobile devices at a time of capturing the image;

identifying the consumer products based on the received images;

determining a product category for each of the identified consumer products;

grouping the customer products based on the product categories determined for the customer products and the corresponding location data for the customer products; and associating and storing at least one determined product category with at least one location based on a density of the grouped customer products and the corresponding location data;

creating a layout corresponding to a physical layout of an area of interest based on the association of the at least one determined product category with the corresponding location data, the layout providing a representation of the at least one product category at the at least one location.

10. The machine-readable medium of claim 9, wherein the location of each mobile device from the one or more mobile devices is determined based on at least one of global positioning service coordinates of the mobile device, a location of a Wi-Fi network to which the mobile device is connected, or a cellular triangulation of the mobile device.

11. The machine-readable medium of claim 9, wherein grouping the images based on the determined product categories and the corresponding location data creates clusters of product categories, wherein a cluster of a product category is identified as a group of consumer products for a given area with a density higher than a predetermined threshold, and each cluster having a corresponding location.

12. The machine-readable medium of claim 11, wherein the instructions for creating the layout corresponding to the physical layout of the area of interest includes instructions to create the layout based on the clusters of product categories and the corresponding locations, the layout providing a representation of product categories at different locations of the layout.

13. The machine-readable medium of claim 12, further comprising instructions for receiving additional data corresponding to additional consumer products, wherein the layout corresponding to the physical layout of the area of interest is updated based on the received additional data.

14. The machine-readable medium of claim 13, wherein each of the clusters comprises an associated confidence level based on the density of the group of consumer products for the given area, and wherein the layout corresponding to the physical layout of the area of interest is updated when the received additional data corresponding to the additional consumer produces causes the associated confidence level to fall below a predetermined threshold.

15. A system for associating a product category of consumer products with a location, the system comprising:

one or more processors; and a machine-readable medium comprising instructions stored therein, which when executed by the processors, cause the processors to perform operations comprising:

receiving data corresponding to consumer products, wherein data for each of the consumer products includes corresponding location data;

identifying each of the consumer products based on the received data;

determining a product category for each of the identified consumer products;

grouping the consumer products based on the product categories determined for the consumer products and the corresponding location data for the consumer products into clusters, wherein each cluster comprises a product category and a given location; and creating a layout corresponding to a physical layout of an area of interest based on the clusters, the layout providing a representation of the product categories at different locations of the layout.

16. The system of claim 15, wherein the consumer products are grouped into clusters when the consumer products have a density higher than a predetermined threshold for a given area.

17. The system of claim 15, wherein the machine-readable medium further comprises instructions for receiving additional data corresponding to additional consumer products, wherein the layout corresponding to the physical layout of the area of interest is updated based on the received additional data.

* * * * *